US011507034B2

(12) United States Patent
Ichikawa et al.

(10) Patent No.: US 11,507,034 B2
(45) Date of Patent: Nov. 22, 2022

(54) INFORMATION PROCESSING APPARATUS, SYSTEM, METHOD FOR CONTROLLING INFORMATION PROCESSING APPARATUS, AND COMPUTER PROGRAM

(71) Applicant: CANON KABUSHIKI KAISHA, Tokyo (JP)

(72) Inventors: Masanori Ichikawa, Kawasaki (JP); Shigeki Hasui, Tokyo (JP); Yusuke Horishita, Yokohama (JP); Takuya Tsukada, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 383 days.

(21) Appl. No.: 16/553,548

(22) Filed: Aug. 28, 2019

(65) Prior Publication Data

US 2020/0073341 A1  Mar. 5, 2020

(30) Foreign Application Priority Data

Sep. 5, 2018 (JP) .............................. JP2018-165887

(51) Int. Cl.
| G05B 13/00 | (2006.01) |
| G05B 13/02 | (2006.01) |
| G06F 1/3231 | (2019.01) |
| G06F 1/3234 | (2019.01) |

(52) U.S. Cl.
CPC ........... *G05B 13/027* (2013.01); *G06F 1/325* (2013.01); *G06F 1/3231* (2013.01)

(58) Field of Classification Search
CPC ........................................................ G06F 1/32
See application file for complete search history.

(56) References Cited

U.S. PATENT DOCUMENTS

| 9,678,559 | B1* | 6/2017 | Devries ................. G06F 1/3265 |
| 10,025,544 | B1 | 7/2018 | Brahma |
| 2008/0005599 | A1* | 1/2008 | Theocharous ........ G06F 1/3203 713/300 |
| 2015/0177817 | A1* | 6/2015 | Badri ..................... G06F 1/3231 713/320 |
| 2017/0139471 | A1* | 5/2017 | Bury ......................... G01J 1/44 |
| 2018/0140228 | A1 | 5/2018 | Olivier |

FOREIGN PATENT DOCUMENTS

| CN | 106658590 A | 5/2017 |
| JP | 2010-147725 A | 7/2010 |

* cited by examiner

*Primary Examiner* — Paul B Yanchus, III
(74) *Attorney, Agent, or Firm* — Canon U.S.A., Inc. IP Division

(57) ABSTRACT

An information processing apparatus and method is provided and controls execution of learning processing thereon. Learning data are generated in which readings of a human presence sensor serve as input values, information on receiving or not receiving any operation from an operation panel serves as success/failure flags. The success/failure flag is generated from an assessment result of a current resumption assessment model and the information on receiving or not receiving an operation, and is provided to the learning data. Accordingly, learning processing is performed using the success/failure flags provided in the learning data, thereby efficiently implementing learning.

10 Claims, 10 Drawing Sheets

LEARNING DATA (N-4)

| SENSOR READING | 90 | 100 | 90 | 100 | 80 |
|---|---|---|---|---|---|
| PRESENCE OR ABSENCE OF OPERATION | ABSENT | | | | |
| FLAG | FAILURE | | | | |

DATA MANAGEMENT TABLE

| CLOCK TIME | T(0) | T(1) | T(2) | T(3) | T(4) | T(5) | ... | T(N-4) | T(N-3) | T(N-2) | T(N-1) | T(N) | T(N+1) |
|---|---|---|---|---|---|---|---|---|---|---|---|---|---|
| SENSOR READING | 0 | 0 | 10 | 20 | 40 | 50 | ... | 90 | 100 | 90 | 100 | 80 | 40 |
| PRESENCE OR ABSENCE OF OPERATION | ABSENT | ABSENT | ABSENT | ABSENT | ABSENT | ABSENT | ... | ABSENT | ABSENT | PRESENCE | PRESENCE | ABSENT | ABSENT |
| RESUMPTION DETERMINATION RESULT | DO NOT RESUME | DO NOT RESUME | DO NOT RESUME | DO NOT RESUME | DO NOT RESUME | DO NOT RESUME | ... | DO NOT RESUME | DO NOT RESUME | RESUME | RESUME | RESUME | RESUME |
| SUCCESS/ FAILURE FLAG | — | — | — | — | — | SUCCESS | ... | SUCCESS | SUCCESS | SUCCESS | SUCCESS | FAILURE | FAILURE |

LEARNING DATA MANAGEMENT TABLE

| No. | SUCCESS/ FAILURE FLAG | LEARNING DATA | |
|---|---|---|---|
| | | SENSOR READINGS (INPUT DATA) | PRESENCE OR ABSENCE OF OPERATION (CORRECT SOLUTION LABEL) |
| 1 | SUCCESS | [0, 10, 20, 40, 50] | ABSENT |
| 2 | SUCCESS | [80, 90, 100, 90, 100] | PRESENT |
| 3 | FAILURE | [90, 100, 90, 70, 80] | ABSENT |
| ... | ... | ... | ... |

FIG.9

INFORMATION PROCESSING APPARATUS, SYSTEM, METHOD FOR CONTROLLING INFORMATION PROCESSING APPARATUS, AND COMPUTER PROGRAM

BACKGROUND

Field

An exemplary embodiment according to the present disclosure relates to a technique for controlling resumption of an information processing apparatus, in particular an image processing apparatus, that includes a human presence sensor such as an ultrasound sensor when the apparatus is in a power-saving state.

Description of the Related Art

Multi-function image processing apparatuses (multi-function peripherals, which are referred to as "MFP" hereinafter) are known and have multiple functions including printing, scanning, copying, and facsimile. One type of information processing apparatus such as MFP includes a human presence sensor for detecting a person (user) approaching the apparatus and has the function to resume a standby mode or a normal state from a power-saving state (sleep mode) by detecting a person approaching. For example, there is a determination unit configured to determine a sensor reading from a human presence sensor as a feature amount associated with the distance to a person approaching. This determination unit can be used to resume a normal state of an MFP. When the sensor reading shows a certain value or more, the determination unit determines that a person has approached the MFP, and the normal state of the MFP can be resumed. Japanese Patent Application Laid-Open No. 2010-147725) discusses the MFP that is configured to, based on detection records of the human presence sensor and operation records on the operation unit of the MFP, automatically adjust the sensitivity (a threshold) of a human presence sensor that determines whether to resume the MFP from the sleep state.

However, an MFP installed in a certain environment may unavoidably make an erroneous assessment as to whether to resume the MFP. For example, an MFP installed alongside a passage is approached by an MFP user and passersby within a sufficient distance alike. This makes it difficult to determine the presence of a user only based on a feature amount associated a distance no matter how the sensitivity of the human presence sensor is adjusted.

In such a case, using a machine learning model is more effective than using an assessment method using feature amounts designed in advance. Such a machine learning model can find association between and/or the regularity in data acquired in each environment and perform assessment processing based on the acquired data. That is, in an MFP that includes a human presence sensor, the assessment success rate of a resumption assessment model can be improved by causing the resumption assessment model to undergo machine learning in advance with the use of sensor readings of the human presence sensor in various MFP installation environments.

However, learning processing in general requires enormous resource amounts of a central processing unit (CPU), a graphics processing unit (GPU) and a memory. Such learning processing consequently degrades the performance of other processing run on the same system and causes inconveniences such as increase of power consumption in the entire system.

SUMMARY OF THE INVENTION

Accordingly, the present disclosure is directed to an information processing apparatus which is configured to perform control such that bare minimum learning processing is carried out when a machine learning model is applied to resumption assessment for an MFP that includes a human presence sensor. An exemplary embodiment provides an information processing apparatus including a sensor, an assessment unit, an acquisition unit, a generation unit, and a determination unit. Based on a sensor reading acquired from the sensor and by use of a machine learning model, the assessment unit assesses whether to change a power control state of the information processing apparatus. The acquisition unit acquires operation information on the operation panel. The generation unit generates, based an assessment result output by the assessment unit and the operation information acquired by the acquisition unit, success/failure information on the assessment result and provides the success/failure information to learning data. The storage unit stores the learning data each piece of which is composed at least of the sensor reading, the operation information, and the success/failure information. In a case where the piece of learning data that has the success/failure information provided therein satisfies a certain condition, the determination unit determines that learning of the machine learning model using the piece of learning data be executed.

Further features of the present disclosure will become apparent from the following description of exemplary embodiments (with reference to the attached drawings).

DESCRIPTION OF THE EMBODIMENTS

Exemplary embodiments for implementing the present disclosure are described below using the drawings. Unless otherwise specified, the scope of the present disclosure includes any configuration that executes functions according to the disclosure regardless whether the configuration is formed as a single apparatus or as a system composed of a plurality of apparatuses capable of communication via a network.

<External Appearance of MFP 101>

Figure 1:
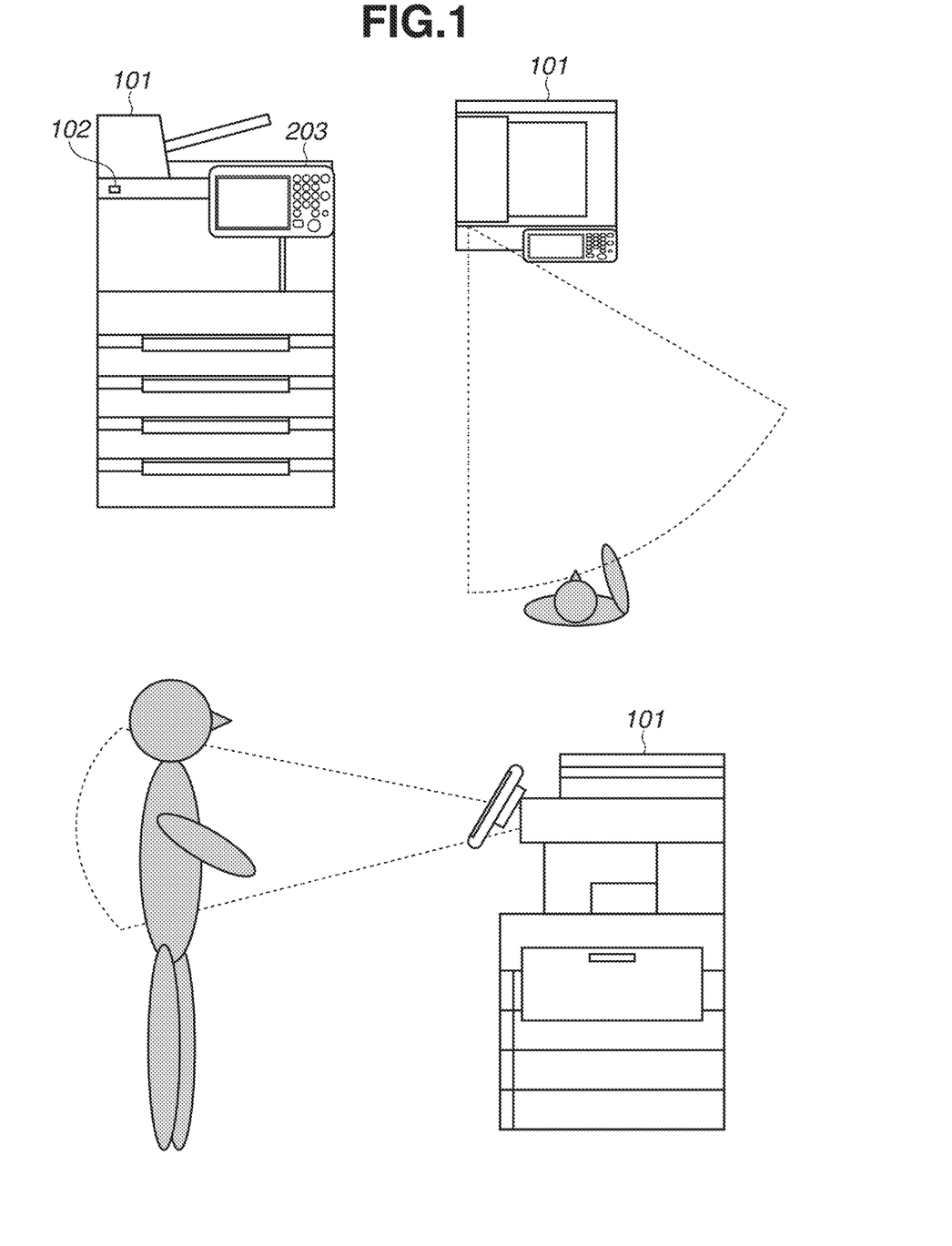
FIG. 1 illustrates a front view, a side view, and a top view of a multi-function peripheral (MFP).

A first exemplary embodiment is now described. FIG. 1 illustrates a front view, a side view, and a top view of a multi-function peripheral (MFP) 101.

The MFP 101 has multiple functions including a printing function, a scanning function, a copy function, and a facsimile function. In the upper front part of the main body of the MFP 101, the MFP 101 includes a human presence sensor 102 as a sensor to detect an object present around the MFP 101. The human presence sensor 102 is, for example, an ultrasound sensor and has a sectoral detection area that spreads in front of the MFP 10 radially from the human presence sensor. A signal output from the human presence sensor 102 is processed by a central processing unit (CPU) 215 in an operation unit 203. The human presence sensor 102 is capable of continuing to acquire the state of the detection area as long as the power supply of the MFP 101 is not off.

<Configuration of MFP 101>

Figure 2:
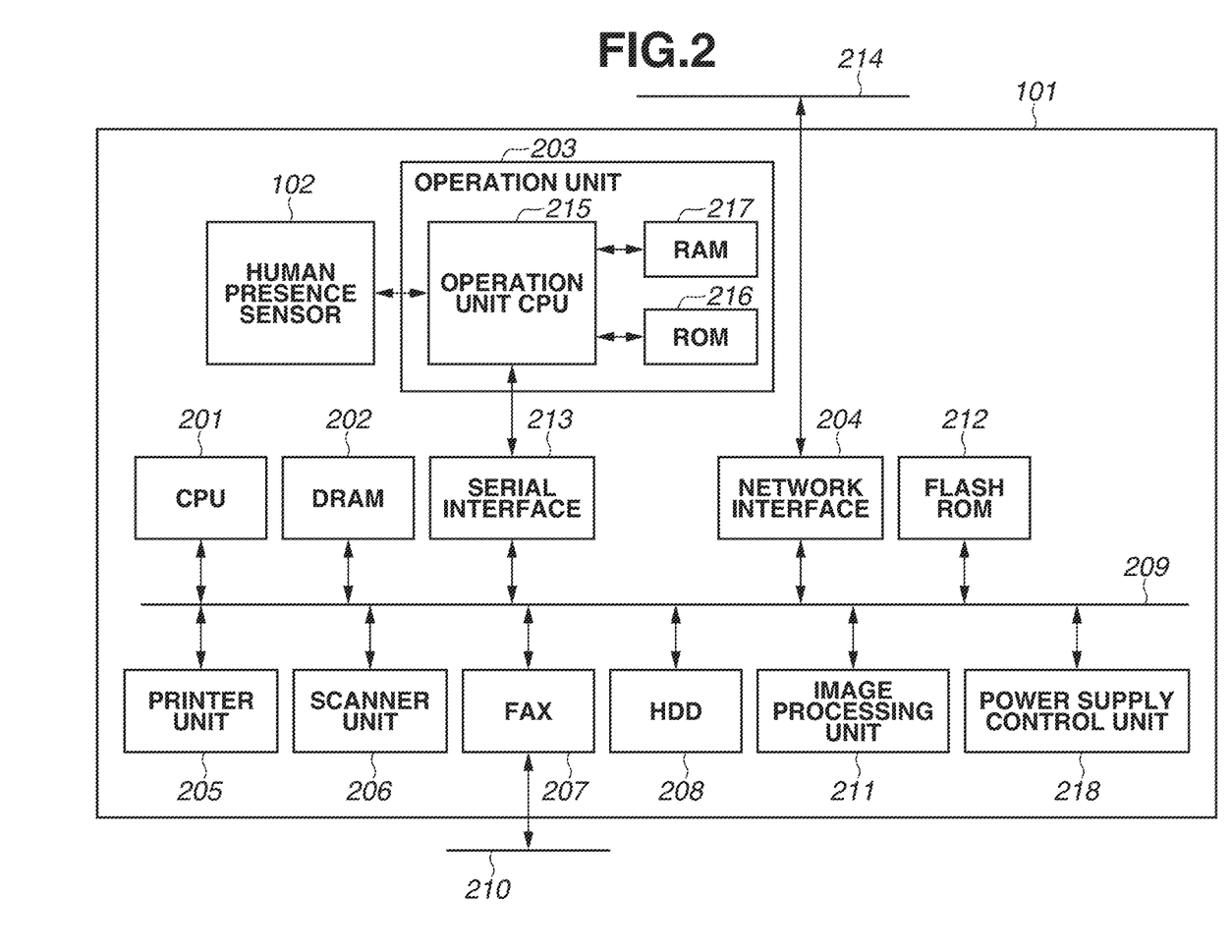
FIG. 2 is a block diagram of the MFP.

FIG. 2 is a diagram illustrating the configuration of the MFP 101, in which a CPU 201 supervises the entire control of the MFP 101.

A dynamic random access memory (DRAM) 202 stores therein a computer program to be executed by the CPU 201 and functions as a work area for temporary data.

The operation unit 203 includes input and output (display) interfaces (not illustrated) for a user such as a liquid crystal display (LCD), a touch panel, hardware keys, and a light-emitting diode (LED), and also includes the operation unit CPU 215.

The operation unit CPU 215 is connected to a system bus 209 via a random access memory (RAM) 217, a read-only memory (ROM) 216, and a serial interface 213 that are included in the operation unit 203. The operation unit CPU 215 is also connected to the human presence sensor 102. The operation unit 203 may further include a communication interface, such as a near field communication reader/writer or a Bluetooth (registered trademark) module, for communication with a mobile terminal held by a user. The operation unit CPU 215 is a one-chip microcomputer and has a timer (not illustrated) inside. The timer may be a software timer that is implemented through execution of a computer program by the operation unit CPU 215. The operation unit CPU 215 notifies the CPU 201, via a serial interface 213, of an operation performed by a user.

A network interface 204 is connected to a local area network (LAN) 214, and the MFP 101 communicates with an external apparatus via the network interface 204.

A printer unit 205 prints image data on a paper surface.

A scanner unit 206 optically reads an image on a paper surface, converts the image into electrical signals, and generates a scanned image.

A facsimile 207 is connected to a public line 210 to perform facsimile communication with an external apparatus.

A hard disk drive (HDD) 208 stores therein a computer program to be executed by the CPU 201 and is used as a spool area for jobs such as a print job and a scan job.

The system bus 209 connects individual modules to one another and perform communication.

An image processing unit 211 executes processing such as image conversion processing for converting a print job received via the network interface 204 into an image suitable to be printed by the printer unit 205 or image processing on a scanned image read by the scanner unit 206. More specifically, in the image conversion processing, image data (page description language (PDL) code) received from an external apparatus through the LAN 214 via the network interface 204 is changed into bitmap data. In the image processing on a scanned image, image processing as pre-processing for the printer unit 205 to print image data is performed. A flash ROM 212 stores therein a computer program to be executed by the CPU 201 and also stores therein, for example, default setting values of the MFP 101, default setting values for each user, and temporary custom setting values (hereinafter collectively referred to as "default setting values").

The serial interface 213 connects the operation unit 203 and the system bus 209 to each other. The LAN 214 provides mutual connection to an external apparatus to enable communication therewith.

The operation unit CPU 215 assumes the functions of controlling the operation unit 203, controlling the human presence sensor 102, and controlling reading, writing, and other operation of the ROM 216 and the RAM 217. The operation unit CPU 215 may not necessarily assume the function of controlling the human presence sensor 102, and another CPU may assume the function of controlling the human presence sensor 102.

The ROM 216 is embedded in the operation unit 203 and stores therein a computer program to be executed by the operation unit CPU 215. The RAM 217 is embedded in the operation unit 203 and stores therein data acquired from the human presence sensor 102 and the operation unit 203.

A power supply control unit 218 controls the power supply of the MFP 101 in accordance with the CPU 201, the operation unit CPU 215, or an operation performed on the operation unit 203 (for example, an operation performed on a power-saving button) by a user.

<Operational Modes of MFP 101>

Next, two operational modes of the MFP 101 for power-saving standby states are described. The MFP 101 can take a power control state by entering one of the operational modes, a standby mode (Standby) and a sleep mode (Sleep) in which power consumption is smaller than the standby mode. The standby mode is an operational mode for waiting in a state where scanning operation and printing operation can be execute. The sleep mode is an operational mode for waiting in a more power-saving state than the standby mode.

The CPU 201 causes the MFP 101 to shift from the standby mode to the sleep mode if the MFP 101 has not been used for predetermined time in the standby mode. For example, the CPU 201 causes to shift an operational mode for the MFP 101 from the standby mode to the sleep mode if a state where no user operates the operation unit 203 and where no job is received has continued for a predetermined time.

<Processing by Operation Unit CPU 215>

Figure 3:
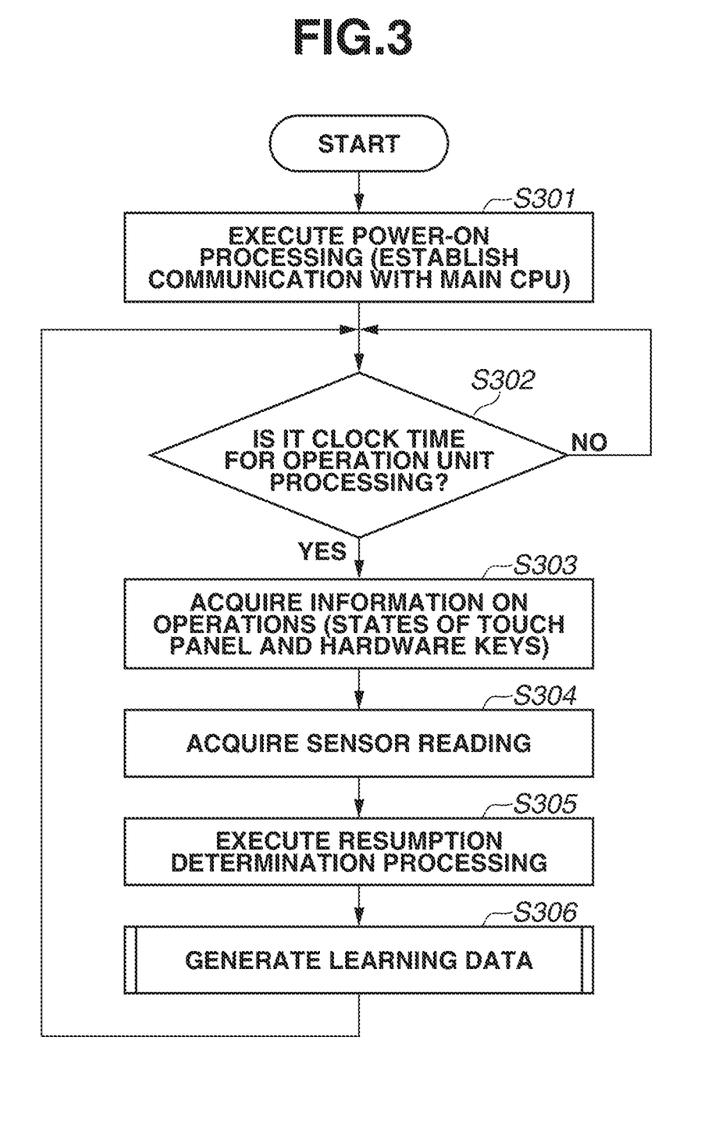
FIG. 3 is a flowchart illustrating the entire processing of an operation unit CPU.

Next, the processing flow for the operation unit CPU 215 is described using a flowchart illustrated in FIG. 3.

The operation unit CPU 215 is configured to execute the processing illustrated in FIG. 3 by reading out and executing a control program stored in the ROM 216. The processing in this flowchart is started when the power supply of the MFP 101 is turned ON. In step S301, the operation unit CPU 215 performs negotiation with the main CPU 201 via the serial interface 213 and establishes communication.

In step S302 that follows, the operation unit CPU 215 refers to the count value of the timer (not illustrated) internally included therein, determines whether it is a clock time when operation-unit processing for acquiring the states of the input interfaces in the operation unit 203 should be executed, and waits until it gets to the clock time when the operation-unit processing should be executed.

If it gets to the clock time when the operation-unit processing should be executed (YES in step S302), the operation unit CPU 215 acquires the states of the touch panel and the hardware keys in the operation unit 203 in step S303, thereby acquiring information on operations performed by a user on the MFP 101. The operation unit CPU 215 stores the acquired information on operations in a data management table (described later) illustrated in FIG. 5.

Figure 5:
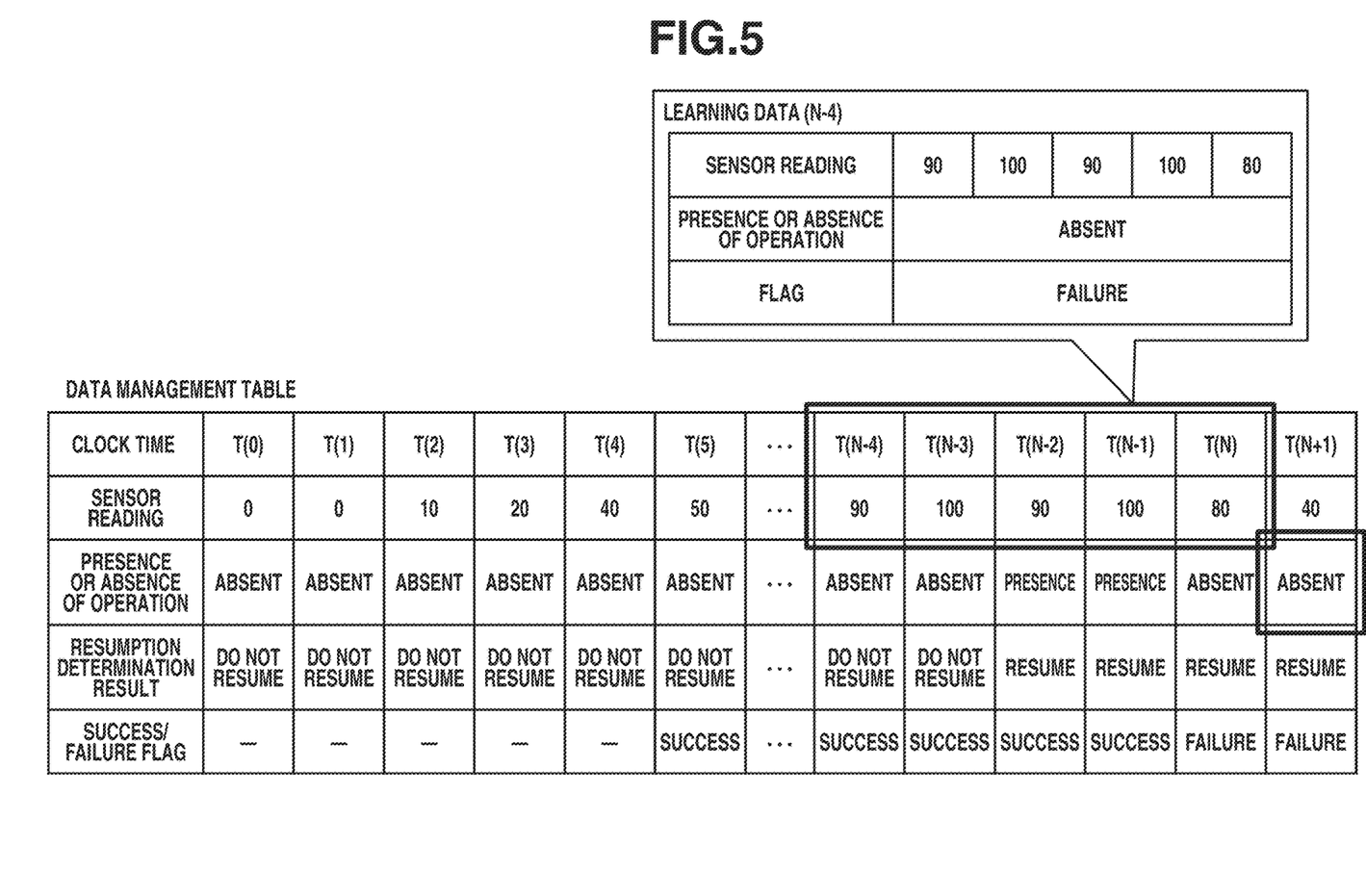
FIG. 5 is a schematic diagram explaining the format of learning data.

In step S304, the operation unit CPU 215 acquire a sensor reading of the human presence sensor 102 and stores the sensor reading in the data management table illustrated in FIG. 5. In the present exemplary embodiment, the operation unit CPU 215 can acquire the distance between the MFP 101 and an object present in front of the MFP 101 by controlling the human presence sensor 102 to output ultrasound outward from the front side of the MFP 101 and measuring a period of time taken for a reflected wave of the output ultrasound to be received. In step S305, the operation unit CPU 215 executes resumption assessment processing. In the present exemplary embodiment, the resumption assessment processing is performed using a resumption assessment model formed of a recurrent neural network (RNN), which is a recurrent machine learning model that has undergone learning in advance. The resumption assessment is performed by inputting the sensor reading acquired in step S304 in the resumption assessment model. Furthermore, the operation unit CPU 215 stores the result of the resumption assessment in the field for resumption assessment results in the data management table, which is described later in connection with FIG. 5, and notifies the power supply control unit 218 of the result via the serial interface 213. In step S306, the operation unit CPU 215 generates learning data from the data management table, which is described later in connection with FIG. 5, and stores the learning data in the RAM 217. The learning data generation is detailed later. The processing then returns to step S302 and the processing in steps S302 to S306 is repeated.

<Processing for Generating Learning Data>

Figure 4:
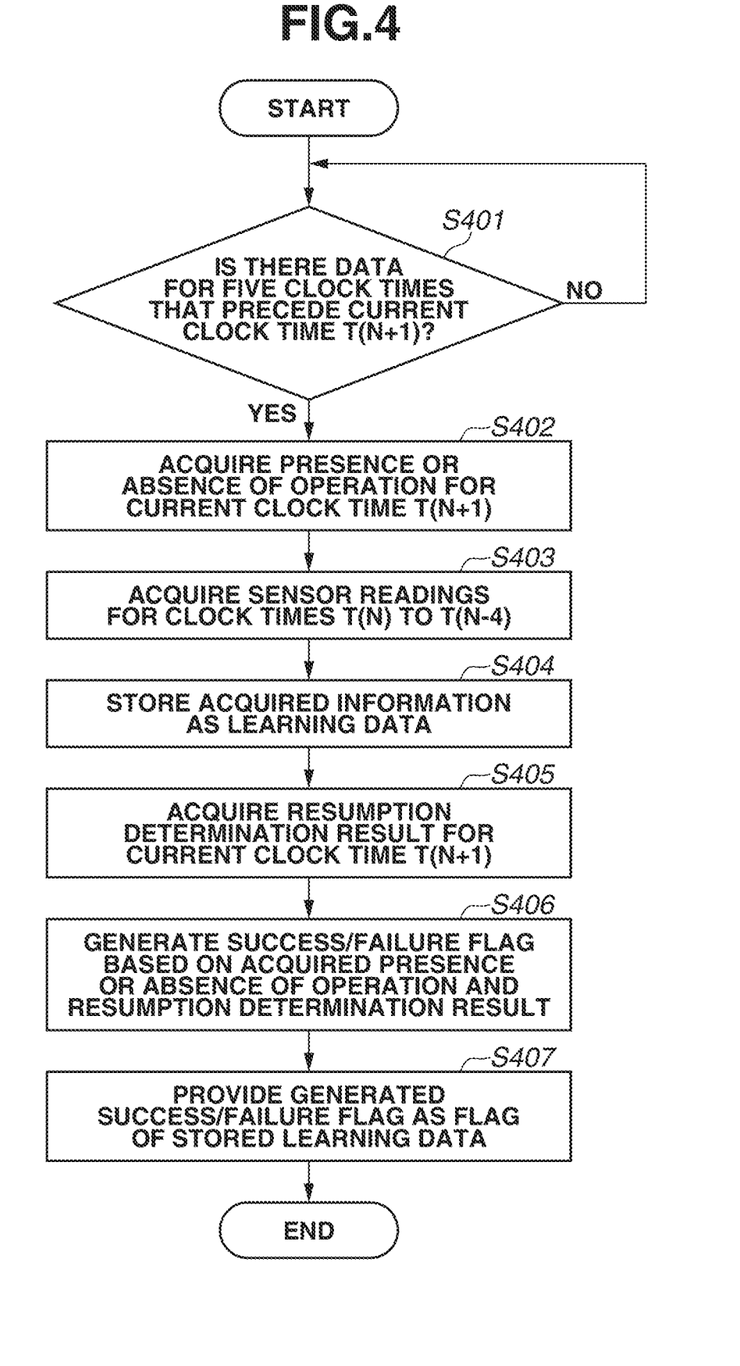
FIG. 4 is a flowchart illustrating processing for generating learning data.

The processing for generating learning data in step S306 in FIG. 3 to be performed by the operation unit CPU 215 is described in detail using FIG. 4. The description regarding FIG. 4 assumes that a clock time when the processing is performed is t=T(N+1) and that the number of clock times for the RNN is 5. In step S401, the operation unit CPU 215 determines whether the data management table has data therein that correspond to five clock times that precede the current clock time T(N+1). The data management table is described here using the example provided in FIG. 5. The data management table has the sensor reading, information on receiving or not receiving any operation, the resumption assessment result, and the success/failure flag for each clock time stored therein. As described above, the sensor reading is acquired in step S304 in FIG. 3 and stored in the data management table. Likewise, the information on receiving or not receiving any operation and the resumption assessment result are acquired in step S303 in FIG. 3 and step S305 in FIG. 3, respectively, and stored in the data management table. The success/failure flag is generated in step S406 as described later.

Here, an example is described assuming that the current clock time is T(5). The data management table has data therein that corresponds to 5 clock times from clock times T(0) to T(4) that precede the clock time T(5). Therefore, if the current clock time is assumed to be T(5), data that corresponds to the 5 clock times that precede the current clock time is determined to be present in the data management table in step S401, and the processing proceeds to step S402. In contrast, if the current clock time is assumed to be T(4), only data that corresponds to 4 clock times from the clock times T(0) to T(3) that precede the clock time T(4) is present. Therefore, if the current clock time is assumed to be T(4), data that corresponds to the 5 clock times that precede the current clock time is determined not to be present in the data management table in step S401, and the processing enters a waiting state in step S401.

While the processing according to the present exemplary embodiment determines whether data that corresponds to 5 clock times is present, what to be determined depends on the configuration of an RNN model used in the resumption assessment model. An RNN is detailed later. An RNN can be considered as including a neural network that corresponds to the number of clock times along the time axis. The number of clock times here is variable. In the present exemplary embodiment, the presence or absence of data corresponding 5 clock times is determined because the number of clock times applied in the RNN model is set to 5. However, this example is not limiting, and the number of clock times may be different depending on the configuration of the RNN model.

In step S402, the operation unit CPU 215 acquires information on receiving or not receiving any operation at the current clock time T(N+1), from the data management table. In the case of the data management table in FIG. 5, the operation unit CPU 215 acquires information indicating the "absence".

In step S403, the operation unit CPU 215 acquires the sensor readings for the clock times T(N) to T(N−4), from the data management table. In the case of the data management table in FIG. 5, the operation unit CPU 215 sequentially acquires the sensor readings of "90, 100, 90, 100, and 80" starting from the clock time T(N−4).

In step S404, the operation unit CPU 215 stores, as learning data, the acquired information on receiving or not receiving any operation and the acquired sensor readings for the five clock times. Learning data generated when the current clock time is assumed to be T(N+1) is learning data (N−4) in FIG. 5. The sensor readings and the information on receiving or not receiving any operation are values acquired in steps S402 and S403. Such sets are successively stored as learning data.

In step S405, the operation unit CPU 215 acquires a resumption assessment result for the current clock time T(N+1) from the data management table. In the case of the data management table in FIG. 5, the operation unit CPU 215 acquires the resumption assessment result indicating "resume".

In step S406, from the acquired information on receiving or not receiving any operation and the acquired resumption assessment result, the operation unit CPU 215 generates a success/failure flag that is success/failure information. If the combination of the resumption assessment result and the information on receiving or not receiving any operation is either "receiving any operation and resume" or "not receiving any operation and do not resume", the operation unit CPU 215 generates a "success" flag and otherwise generates a "failure" flag. At the clock time T(N+1), information indicating "not receiving any operation and resume" is acquired, which is neither of the above combinations, so that a failure flag is generated.

In step S407, the operation unit CPU 215 provides the generated success/failure flag as a flag to the learning data stored in step S404. The provision of this flag makes it possible to instantly grasp whether the generated learning data is a data pattern that enables the resumption assessment model to derive a correct solution. Because the RAM 217 has a limited capacity, this example is configured so that learning data may be deleted from the oldest data when there is no capacity left for storing new data.

In this step, the data is stored under the field of "Success/failure Flag" in the data management table.

<Description of Recurrent Machine Learning Model>

Figure 6A:
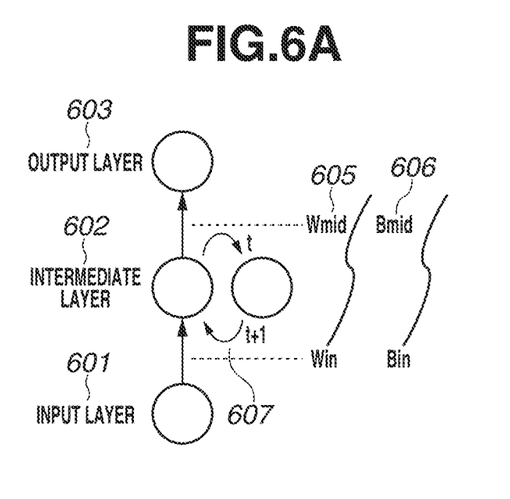
FIGS. 6A to 6C illustrate block diagrams of recurrent machine learning models.
Figure 6B:
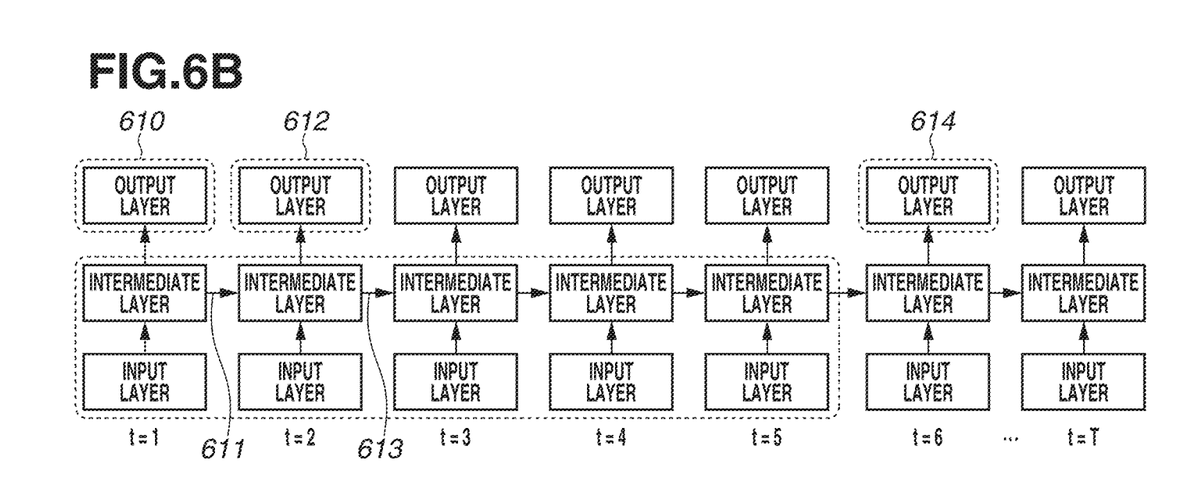
Figure 6C:
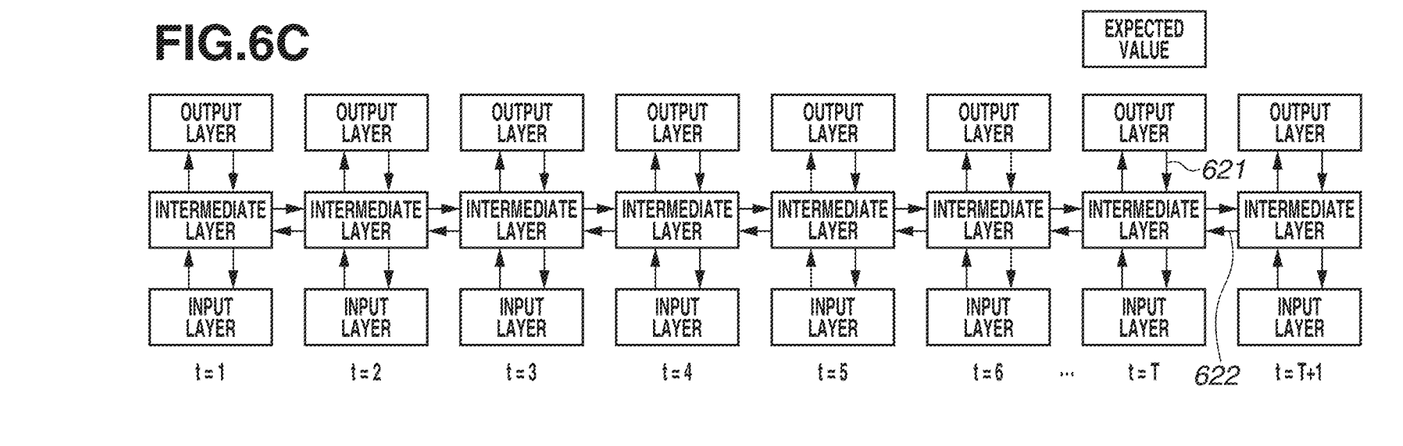

A machine learning model to be applied to resumption assessment processing is described using FIGS. 6A to 6C.

As described above, the sensor readings of the human presence sensor 102 acquired in step S304 are adopted as pieces of time-series data described in connection with step S302 that are acquired at certain time intervals. It is generally known that a recurrent machine learning model is appropriate when machine learning is applied to time-series data. Thus, an exemplary embodiment according to the present disclosure employs an RNN as the machine learning model. Here, a simple recurrent network is taken as an example of an RNN, and the configuration and the processing thereof are described.

<Recurrent Machine Learning Model>

FIG. 6A illustrates a schematic diagram of an RNN. The RNN takes a configuration obtained by modeling neurons, synapses that connect neurons, and synaptic connection strength inputs, similarly to networks of other machine learning models. Specifically, an input layer 601, an intermediate layer 602, and an output layer 603 are included as models of neurons. Each layer is provided with a previously prepared computational expression of a functional form (not illustrated) such as a sigmoid function. Each layer performs computation using an output from an upstream neurons as an input thereto and transfers an output value, which is a computational result thereof, to a layer that leads to a downstream neuron. In this outputting, the product of a weight coefficient (W) 605 provided in each synapse and the output value and the sum of this product and a bias coefficient (B) 606 are obtained, so that connection strength between neurons is expressed. The RNN further includes a neuron 607 for making a past output of the intermediate layer 602 a current input. This configuration enables the intermediate layer 602 to perform arithmetic processing using output from an intermediate layer that is based on an input for a past clock time t while using an input for a clock time t+1, which is one clock time later than the clock time t. This arithmetic processing is performed successively at the clock times t=1, 2, 3, and so on, resulting in output that is based on past input data.

<Inference Processing>

Inference processing for obtaining output by inputting time-series data to the RNN is described using FIG. 6B. FIG. 6B is a schematic diagram obtained by unrolling the RNN along the time axis.

As illustrated in FIG. 6B, when the RNN is unrolled along the time axis, the RNN can be interpreted as a multilayer neural network that has a depth of corresponding to the number of clock times along which the RNN is unrolled. If an input is fed to the RNN at the clock time t=1, output from an output layer 610 and output 611 from an intermediate layer for the clock time t=1 are obtained. Subsequently, at the clock time t=2, the intermediate layer determines output of the output layer 612 and output 613 from the intermediate layer for the clock time t=2, based on an input for the clock time t=2 and the output 611 from the intermediate layer for the clock time t=1. The RNN repeats the same processing in a time-series manner and thus can infer an output result based on data that has been input in the past. The number of individual past input data to be used for obtaining an output result is previously set as an input data length for the RNN. For example, setting the input data length to 5, that is, determining an output based on five past inputs among the time-series data may be implemented in such a manner that an output obtained from the output layer 614 at the clock time t=6 with data input at the clock times t=1 to 5 is used as the result.

<Learning Procedure>

A learning procedure for the RNN is described using FIG. 6C. FIG. 6C is a schematic diagram obtained by unrolling the RNN along the time axis as with FIG. 6B. By interpreting this RNN as a multilayer neural network, learning to which an algorithm called back propagation is applied can be implemented in the same manner as in other multilayer neural networks. Thus, a network that suitably changes weight coefficients (W) and bias coefficients (B) provided in the network and outputs a desired result, can be obtained.

An back propagation algorithm mentioned here is a learning procedure in which, based on comparison between an output value obtained by feeding a certain input value to a network and a correct solution to the input value, coefficients (a weight coefficient (W) and a bias coefficient (B)) for the output value in a previous step are changed so that the error between the output value and the correct solution can be smaller. In particular, the RNN implements learning with an algorithm called back propagation through time (BPTT) applicable to a network unrolled along the time axis. With the BPTT algorithm, the learning to which back propagation is applied along the time axis is implemented using not only an error 621 between an output value and a correct solution at the subsequent clock time t=T but also an error 622 that is delivered from the intermediate layer at the clock time t=T+1. Furthermore, in the learning using BPTT, the number of sets of individual data with which the learning is terminated is set, whereby the length of time-series data to be used for learning can be defined. For example, if the number of sets of data with which the learning is terminated is set to 5, the RNN can be learned with the use of the learning data, which has input data for consecutive five clock times and training data that are set as correct solutions with respect to the input data. The learning data is detailed later.

The RNN used in the exemplary embodiment of the present disclosure may be a simple recurrent network as described above or may be a long short term memory (LSTM) based network (not illustrated) obtained by enhancing a simple recurrent network. An LSTM network includes gates configured to control data transfer among layers and thus controls data dependence along the time axis to detail, thereby enabling highly accurate learning and highly accurate assessment processing.

In a machine learning model that performs the resumption assessment processing used in the exemplary embodiment of the present disclosure, either of such networks can implement the above-described inference and learning with the sensor readings set as the input data acquired from the human presence sensor 102 in a time-series manner while the output data takes the form of a binary variable indicating "resume" or "do not resume".

<Power Supply Control Processing by CPU 201>

Figure 7:
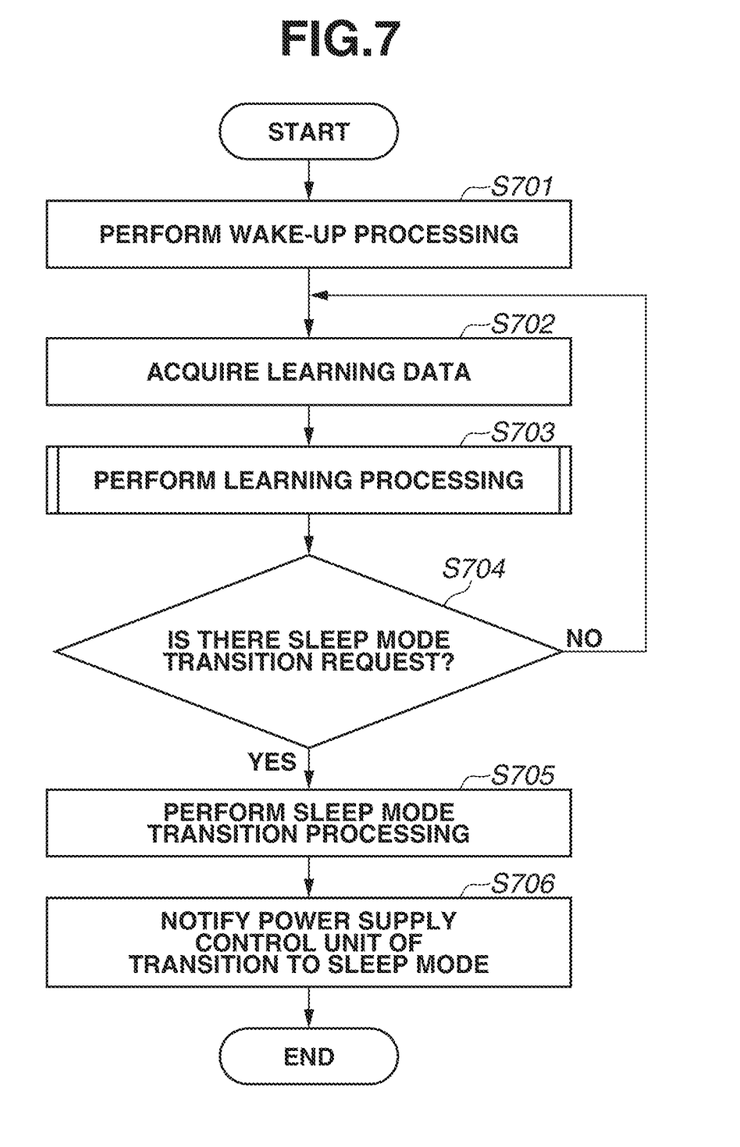
FIG. 7 is a flowchart illustrating power supply control processing.

The power supply control processing to be performed by the CPU 201 is described using FIG. 7. The CPU 201 is configured to execute the processing illustrated in FIG. 7 by reading out and executing a control program stored in the flash ROM 212. In step S701, the CPU 201 performs wake-up processing for transition from the sleep mode to the standby mode. In the wake-up processing, activation processing is performed on the CPU 201, and the initialization of the serial interface 213 is performed. This wake-up processing enables the CPU 201 to communicate with the operation unit CPU 215. In step S702, the CPU 201 acquires learning data. The learning data is data generated by the operation unit CPU 215 in step S306 and stored in the RAM 217. The CPU 201 communicates with the operation unit CPU 215 via the serial interface 213 to acquire information on whether or not the learning data is present. If the learning data is present in the RAM 217, the CPU 201 acquires that learning data, transfers the data to the HDD 208, and store the data therein. If the learning data is absent, the CPU 201 does not acquire the learning data.

Figure 8:
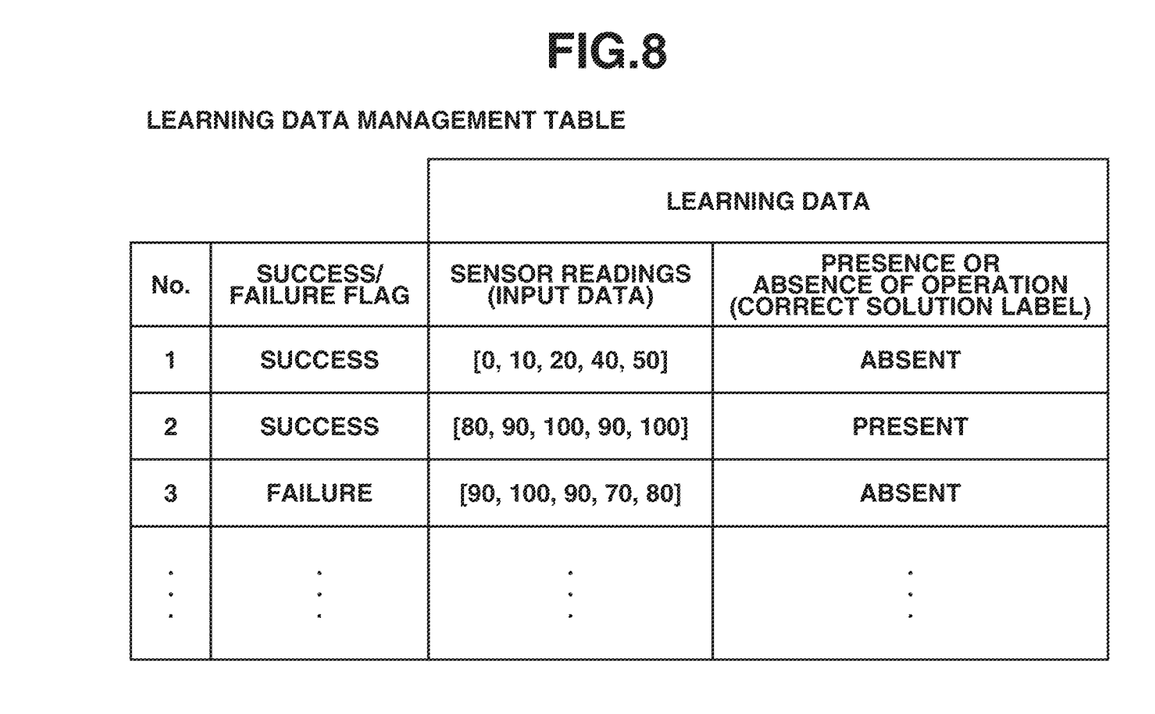
FIG. 8 illustrates a learning data management table.

The learning data thus stored is registered in a learning data management table. FIG. 8 illustrates the learning data management table. The learning data management table contains elements under the following fields: "No." indicating the order in which individual learning data has been acquired; "Success/failure Flag" provided in individual learning data; and "Sensor Reading" and "Receiving or Not Receiving Operation", which constitute learning data. Elements for "Success/failure Flag", the "Sensor Reading", and "Receiving or Not Receiving Operation" that are provided in the individual learning data are stored, as they are, in the learning data management table after being acquired. While elements for "Sensor Reading" serve as input data of learning data, elements for "Receiving or Not Receiving Operation" serve as correct solution labels. The learning data management table is stored in the HDD 208. If the learning data is absent, the CPU 201 does not acquire the learning data. The learning data acquired by the CPU 201 is deleted from the RAM 217.

In step S703, the CPU 201 performs learning processing. The learning data used for the learning processing are the data stored in the HDD 208. A model used for learning is a model identical with the resumption assessment model described in connection with the resumption assessment processing of step S305. This resumption assessment model has already undergone learning at least once, and undergoes additional learning in the present exemplary embodiment. The learning processing using a recurrent machine learning model is detailed later. While in the present exemplary embodiment, the learning processing is performed inside the MFP 101, the learning processing may be performed in an external server or the like (not illustrated). The CPU 201 transfers the resumption assessment model that has completed learning to the operation unit CPU 215. Thereafter, the operation unit CPU 215 performs the resumption assessment processing with the use of the transferred resumption assessment model.

In step S704, the CPU 201 determines whether there is a sleep mode transition request. Transition to the sleep mode is requested by the operation unit CPU 215. The operation unit CPU 215 notifies the power supply control unit 218 of a sleep mode transition request. When the request is notified, the power supply control unit 218 issues an interrupt request to the CPU 201. Therefore, by confirming whether there is an interrupt request from the power supply control unit 218, the CPU 201 can determine whether a sleep mode transition request has been issued. If the CPU 201 determines that there is a sleep mode transition request, the processing proceeds to step S705. If the CPU 201 determines that there is not a sleep mode transition request, the processing returns to step S702. In step S705, the CPU 201 performs sleep mode transition processing. The sleep mode transition processing suspends various processing tasks being performed by the CPU 201 and waits for completion of the suspension. In step S706, the CPU 201 notifies the power supply control unit 218 of the transition to the sleep mode. When the transition to the sleep mode is notified, the power supply control unit 218 shuts down power supply to processing blocks other than the operation unit CPU 215. This processing turns power supply to the CPU 201 off, thereby completing the transition of the MFP 101 to the sleep mode. When the sleep mode transitions to the standby mode, the CPU 201 again starts the processing from step S701.

<Learning Processing>

Figure 9:
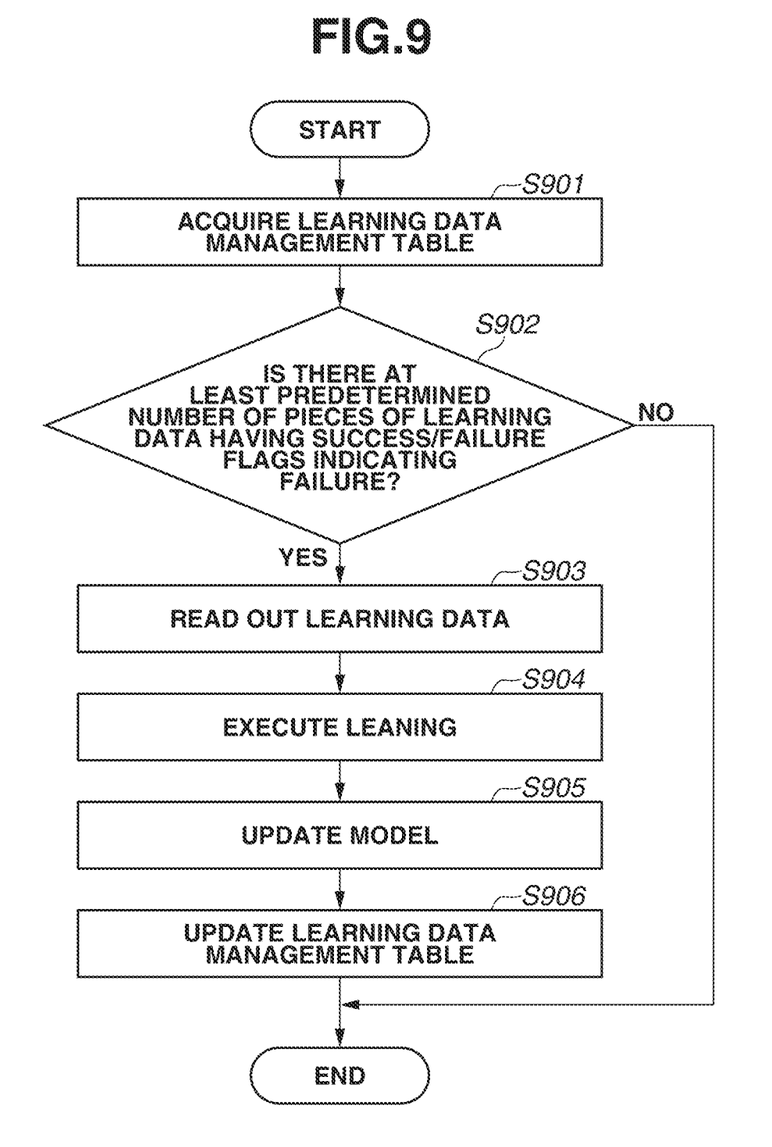
FIG. 9 is a flowchart illustrating learning processing.

The learning processing in step S703 is described using FIG. 9.

Unless otherwise stated, the following operation is executed by the CPU 201 in accordance with a computer program stored in the flash ROM 212.

In step S901, the CPU 201 acquires a learning data management table. The learning data management table has been generated in step S702 in FIG. 7 and has been stored in the HDD 208.

In step S902, the CPU 201 determines whether a certain condition is satisfied. The certain condition is that the learning data management table contains a predetermined number or more of pieces of learning data that have success/failure flags of "failure" provided therein. If the CPU 201 determines that the learning data management table contains the predetermined threshold number or more of pieces of learning data that have success/failure flags of "failure" provided therein, the processing proceeds to step S903 so that subsequent learning processing can be performed. If the number of such pieces of learning data is determined to be less than the predetermined threshold number, the processing flow ends. The predetermined threshold number serves as a criterion with reference to which whether to perform learning processing is determined. The predetermined threshold number may be controlled to change based on the elapsed time since installation of the MFP 101. The threshold number may be set to a smaller number in order to adjust to the installation environment when the elapsed time is smaller, and be controlled to become larger as the elapsed time increases. Alternatively, the threshold number may be set to one, that is, the condition for determining whether to perform the learning may be based on whether there is any learning data that has the success/failure flag of "failure" provided therein.

In step S903, the CPU 201 loads the learning data stored in the HDD 208 into the DRAM 202. The learning processing is performed on all the data managed by the learning data management table. However, this example is not limitative. For example, control may be exercised such that only learning data that has the success/failure flag indicating "failure" may be loaded as data on which learning is performed.

In step S904, the CPU 201 executes learning with the use of the learning data loaded in step S903. The learning is executed by using the above-described procedure with the sensor readings for a predetermined number of clock times as inputs and with information on "receiving or not receiving any operation" from a user as correct solution labels. Values determined based on learning data fed in the developmental stage are incorporated as the initial states of the coefficients (W) and (B) of the corresponding layers. These coefficients for the respective layers are to be updated as appropriate in the installation environment of the MFP. After learning is performed on all of the learning data loaded in step S903, the processing proceeds to step S905.

In step S905, the CPU 201 updates the resumption assessment model. Specifically, the CPU 201 transfers the coefficients of the corresponding layers updated by learning in step S904 to the operation unit CPU 215. The operation unit CPU 215 applies the received coefficients to the resumption assessment model, thereby completing the updating of the resumption assessment model.

In step S906, the CPU 201 updates information on the success/failure flags in the learning data management table using the resumption assessment model after the learning. The learning processing is executed by the CPU 201. Therefore, the resumption assessment model updated in step S905 is naturally stored in the HDD 208 to be used by the CPU 201. The CPU 201 calculates resumption assessment results for individual learning data using the same model as the resumption assessment model updated in step S905 and using sensor readings in the learning data that are being managed by the learning data management table. The CPU 201 generates success/failure flags through the above-described procedure using the obtained resumption assessment results and the information on receiving or not receiving any operation and writes the success/failure flags into the learning data management table, thereby completing update processing. This processing enables management of the success/failure flags so as to agree always with results from the current resumption assessment model that is running under the operation unit CPU 215.

The above-described learning processing is performed by the CPU 201 in the MFP 101, which is an information processing apparatus. However, since the learning processing is processing which requires resources of the CPU and other components, regarding the processing in steps S903 and S904, the learning data may be transmitted to an external server connected via a network and the server may execute the learning processing. In that case, the model having the coefficients and other elements updated through learning is received from the server to be used and applied.

As described above, the present exemplary embodiment illustrates a case in which resumption assessment processing that employs a machine learning technique is applied to an MFP that includes a human presence sensor. A particular feature thereof is to perform control to automatically generate learning data and automatically perform learning as necessary. Furthermore, the ability of a current resumption assessment model to output a correct solution value is provided in a form of a success/failure flag. In this configuration, it is possible to perform control such that the learning can be performed only when the resumption assessment model has been able to acquire a data pattern from which a correct solution value cannot be inferred. In other words, it is possible to perform control not to perform the learning when a set of learning data composed of data patterns from which a correct solution value can be inferred. Consequently, the procedure described in the present exemplary embodiment makes it possible to exercise control so as to perform minimum necessary learning processing while automatically generating learning data. The procedure thus makes it possible to eliminate unnecessary learning.

The exemplary embodiment is described with an image processing apparatus such as an MFP taken as an example of an information processing apparatus. However, the learning processing control method according to the present disclosure is applicable to any apparatus that includes a sensor configured to detect an object present in the neighborhood of the sensor and that is capable of changing the state, such as the power control state, of the apparatus by making assessment based on sensor readings of the sensor by use of a machine learning model.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-165887, filed Sep. 5, 2018, which is hereby incorporated by reference herein in its entirety.

What is claimed is:
1. A machine learning system of an information processing apparatus comprising:
 a sensor;
 an operation unit;
 a machine learning unit configured to, upon receiving an input of output values in time series acquired from the sensor, determine whether to change a power control state of the information processing apparatus;
 one or more controllers having one or more processors and one or more memories, the one or more controllers configured:
 to acquire operation information from the operation unit;
 to generate success/failure information on the output values based on a determination result output by the machine learning unit and the operation information and to provide the success/failure information to learning data;
 to store therein the learning data which is composed of at least the output values in time series, the operation information, and the success/failure information; and
 in a case where a piece of the learning data that has the success/failure information provided therein satisfies a certain condition, determine that learning of a machine learning model using the piece of the learning data which is composed of at least the output values in time series, the operation information, and the success/failure information, be executed,
 wherein the certain condition relates to a plurality of pieces of learning data that have information indicating failure of the success/failure information.

2. The machine learning system of the information processing apparatus according to claim 1, wherein the one or more controllers are configured, when the stored learning data contain a predetermined number or more of pieces of learning data in which the success/failure information indicating failure is provided, to determine that the learning be executed.

3. The machine learning system of the information processing apparatus according to claim 2, wherein the predetermined number changes along with elapsed time since installation of the information processing apparatus.

4. The machine learning system of the information processing apparatus according to claim 1,
wherein the power control state is a first power control state, or a second power control state in which power consumption is smaller than in the first power control state, and
wherein the operation information is information on receiving or not receiving any operation from the operation panel.

5. The machine learning system of the information processing apparatus according to claim 1, wherein the one or more controllers are configured:
to generate the success/failure information in which the success/failure information is labeled as success when a combination of the determination result from the machine learning unit and the operation information is identical with a predetermined combination and the success/failure information is labeled as failure when the combination is different from the predetermined combination.

6. The machine learning system of the information processing apparatus according to claim 1, wherein the information processing apparatus updates the success/failure information in the learning data using the machine learning unit after learning processing.

7. The machine learning system of the information processing apparatus according to claim 1, wherein the machine learning model that is used by the machine learning unit is a recurrent neural network.

8. The machine learning system of the information processing apparatus according to claim 1, wherein the information processing apparatus is an image processing apparatus.

9. The machine learning system of the information processing apparatus according to claim 1, wherein the one or more controllers are configured:
to execute learning of the machine learning model using the learning data; and
to update the machine learning model.

10. A method for controlling an machine learning system of an information processing apparatus that includes a storage unit, a sensor and an operation unit, the method comprising:
using a machine learning model which, upon receiving an input of output values in time series acquired from the sensor, determines whether to change a power control state of the information processing apparatus;
acquiring operation information from the operation unit;
generating success/failure information on the output values, based on a determination result output by using the machine learning model and the operation information, success/failure information on the determination result and providing the success/failure information to learning data;
storing the learning data which is composed of at least the output values in time series, the operation information, and the success/failure information, in the storage unit; and
in a case where the piece of the learning data that has the success/failure information provided therein satisfies a certain condition, determining that learning of the machine learning model using the piece of the learning data which is composed of at least the output values in time series, the operation information, and the success/ failure information be executed,
wherein the certain condition relates to a plurality of pieces of learning data that have information indicating failure of the success/failure information.

* * * * *